(12) United States Patent
Sabatelli et al.

(10) Patent No.: US 7,912,964 B2
(45) Date of Patent: Mar. 22, 2011

(54) METHOD AND APPARATUS FOR REFACTORING A GRAPH IN A GRAPHICAL PROGRAMMING LANGUAGE

(75) Inventors: Alessandro Sabatelli, San Francisco, CA (US); Nathan Wertman, Boulder Creek, CA (US); Pierre-Olivier Latour, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 447 days.

(21) Appl. No.: 11/811,118

(22) Filed: Jun. 8, 2007

(65) Prior Publication Data

US 2008/0307097 A1    Dec. 11, 2008

(51) Int. Cl.
*G06F 15/16*    (2006.01)
(52) U.S. Cl. ........................................ 709/227; 717/102
(58) Field of Classification Search ................... 709/227
See application file for complete search history.

(56) References Cited

U.S. PATENT DOCUMENTS

| | | | |
|---|---|---|---|
| 6,167,553 A * | 12/2000 | Dent | 714/819 |
| 6,546,532 B1 * | 4/2003 | Kerzman et al. | 716/8 |
| 7,076,762 B2 * | 7/2006 | Fisher | 717/102 |
| 7,451,439 B2 * | 11/2008 | Nickell et al. | 717/159 |
| 2002/0099806 A1 * | 7/2002 | Balsamo et al. | 709/223 |
| 2003/0145246 A1 * | 7/2003 | Suemura | 714/2 |
| 2004/0040017 A1 * | 2/2004 | Kershenbaum et al. | 717/158 |
| 2007/0129906 A1 * | 6/2007 | Stoecker et al. | 702/108 |
| 2007/0162903 A1 * | 7/2007 | Babb et al. | 717/154 |
| 2008/0082984 A1 * | 4/2008 | McDaniel | 718/106 |
| 2008/0239401 A1 * | 10/2008 | Stevens | 358/3.06 |

* cited by examiner

*Primary Examiner* — Wing F Chan
*Assistant Examiner* — Tesfay Yohannes
(74) *Attorney, Agent, or Firm* — Park, Vaughan, Fleming & Dowler LLP

(57) ABSTRACT

One embodiment of the present invention provides a system that refactors a port of a node in a graph, wherein the node has one or more input ports and one or more output ports. During operation, the system identifies an input port of the node to be refactored. The system then creates a pass-through node, wherein the value on an output port of the pass-through node equals the value on an input port of the pass-through node. Next, the system connects the output port of the pass-through node to the input port to be refactored, so that the refactored input port receives a value that is set on the input port of the pass-through node.

17 Claims, 5 Drawing Sheets

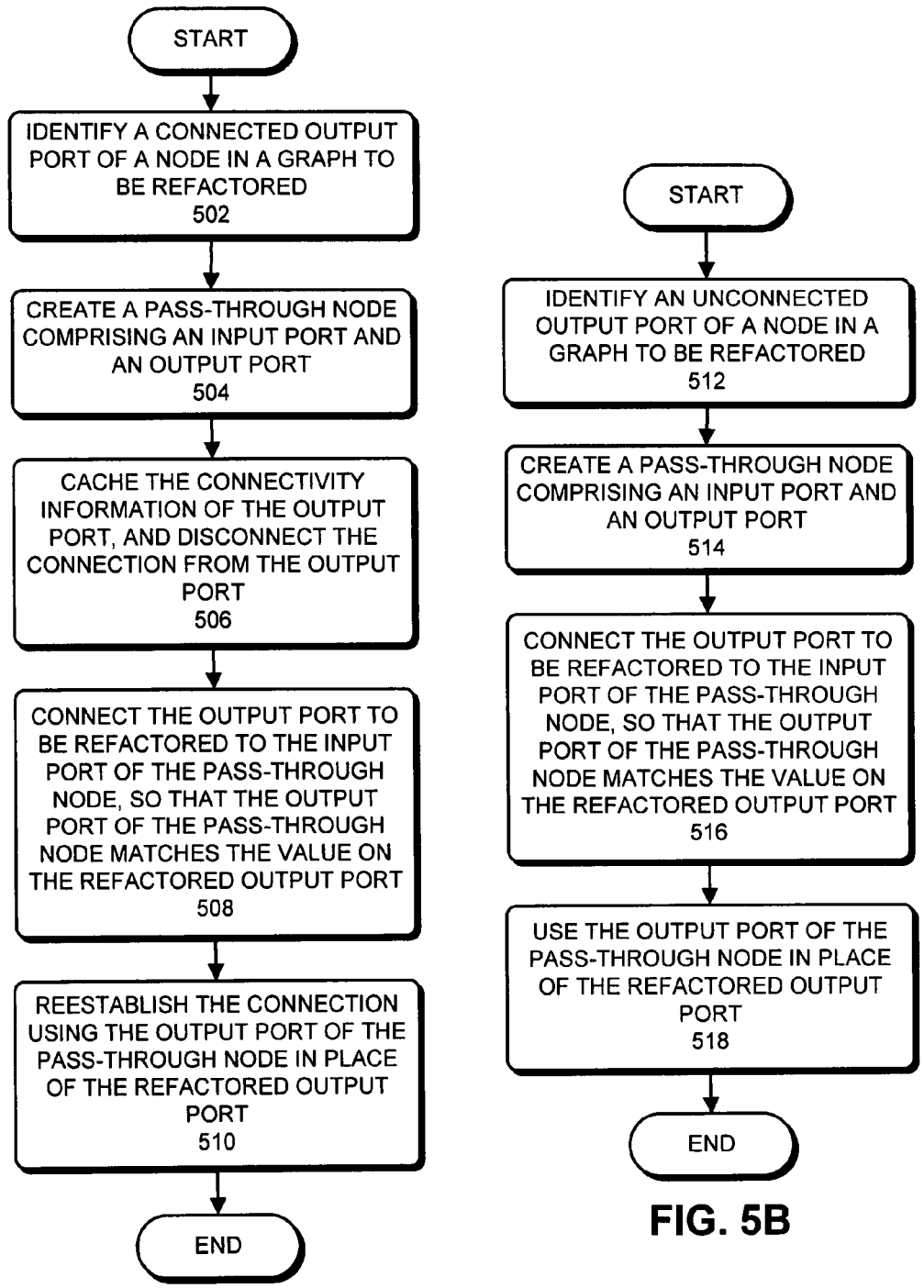

METHOD AND APPARATUS FOR REFACTORING A GRAPH IN A GRAPHICAL PROGRAMMING LANGUAGE

BACKGROUND

1. Field of the Invention

The present invention relates to the design of a graphical programming language interface. More specifically, the present invention relates to a method and an apparatus that refactors a graph structure expressed in a graphical programming language by inserting pass-through nodes into the graph.

2. Related Art

A graphical programming language (GPL) enables a programmer to interact with programs by graphically manipulating program components through a graphical user interface (GUI). Specifically, a program within a GPL is typically comprised of multiple base processing units, such as subroutines, or functions, and these base processing units are represented graphically as "boxes" or "patches" within the GUI. Each "patch" can have a number of input ports for receiving input variables/parameters, and a number of output ports for outputting results when the patch is executed. The relationships between patches can be understood by viewing their spatial arrangements and associated connectivity information within the GUI. This connectivity information is typically illustrated using lines, arrows, or arcs that connect the output ports of upstream patches to the input ports of downstream patches. The collection of the patches and the connections between the patches form a "graph" structure for a corresponding program.

During a graphical programming process, a programmer sometimes "refactors" a graph to improve the quality of the graph. The process of refactoring a program can be defined as "changing a software system in such a way that it does not alter the external behavior of the code, yet improves its internal structure." (See M. Fowler, "*Refactoring: Improving the Design of Existing Programs*," Addison-Wesley, 1999.) Within a GPL, a refactoring operation can be viewed as changing a graph to improve the topology of the graph while preserving the functional connectivity of the graph. Refactoring a graph can improve the graph's structure, making it easier to understand and modify, and allowing it to execute more efficiently.

One aspect of graph refactoring involves redistributing input and output variables in the graph to facilitate future extensions. In particular, it is often desirable to refactor the value on an input port of a patch to other input ports of other patches. Note that one can set a value on an input port by connecting an output port to the input port. However, it is generally prohibited to connect an input port directly to other input ports. Consequently, refactoring an input port associated with a desired value often requires a programmer to manually: (1) create a new patch in the graph; (2) set the value on the output port of the new patch to the desired input port value; (3) connect the output port of the new patch to the target input port; and (4) connect the output port of the new patch to other input ports that require the desired value. Unfortunately, this multi-step refactoring procedure is both tedious and error-prone.

Hence, what is needed is a method and a apparatus that can refactor an input port without the above-described problems.

SUMMARY

One embodiment of the present invention provides a system that refactors a port of a node in a graph, wherein the node has one or more input ports and one or more output ports. During operation, the system identifies an input port of the node to be refactored. The system then creates a pass-through node, wherein the value on an output port of the pass-through node equals the value on an input port of the pass-through node. Next, the system connects the output port of the pass-through node to the input port to be refactored, so that the refactored input port receives a value that is set on the input port of the pass-through node.

In a variation on this embodiment, if the input port to be refactored is initially connected, the system caches the connectivity information for the input port to be refactored. Next, the system disconnects the connection to the input port to be refactored. The system then reestablishes the connection at the input port of the pass-through node instead of at the refactored input port.

In a further variation on this embodiment, the system reestablishes the connection by using the cached connectivity information to establish the connection.

In a variation on this embodiment, if the input port to be refactored is initially unconnected and if the value on the input port is set, the system sets a value on the input port of the pass-through node to match the value on the input port to be refactored. In this way, the value on the output port of the pass-through node equals the value on the input port to be refactored.

In a variation on this embodiment, the value on the input port of the pass-through node can include a data object, such as a bitmap.

Another embodiment of the present invention provides a system that refactors a port of a node in a graph, wherein the node has one or more input ports and one or more output ports. During operation, the system identifies an output port of the node to be refactored. The system then creates a pass-through node, wherein the value on an output port of the pass-through node equals the value on an input port of the pass-through node. Next, the system connects the output port of the node to be refactored to the input port of the pass-through node, so that the output port of the pass-through node matches a value on the refactored output port. The system then uses the output port of the pass-through node in place of the refactored output port.

In a variation on this embodiment, if the output port to be refactored is initially connected, the system caches the connectivity information for that output port. Next, the system disconnects the connection from the output port to be refactored. The system then reestablishes the connection using the output port of the pass-through node in place of the refactored output port.

In a further variation on this embodiment, the system reestablishes the connection by using the cached connectivity information to establish the connection.

In a variation on this embodiment, the value on the input port of the pass-through node can include a data object, such as a bitmap.

BRIEF DESCRIPTION OF THE FIGURES

FIG. 5A presents a flowchart illustrating the process of refactoring a connected output port in accordance with an embodiment of the present invention.

FIG. 5B presents a flowchart illustrating the process of refactoring an unconnected output port in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Computer System

Figure 1:
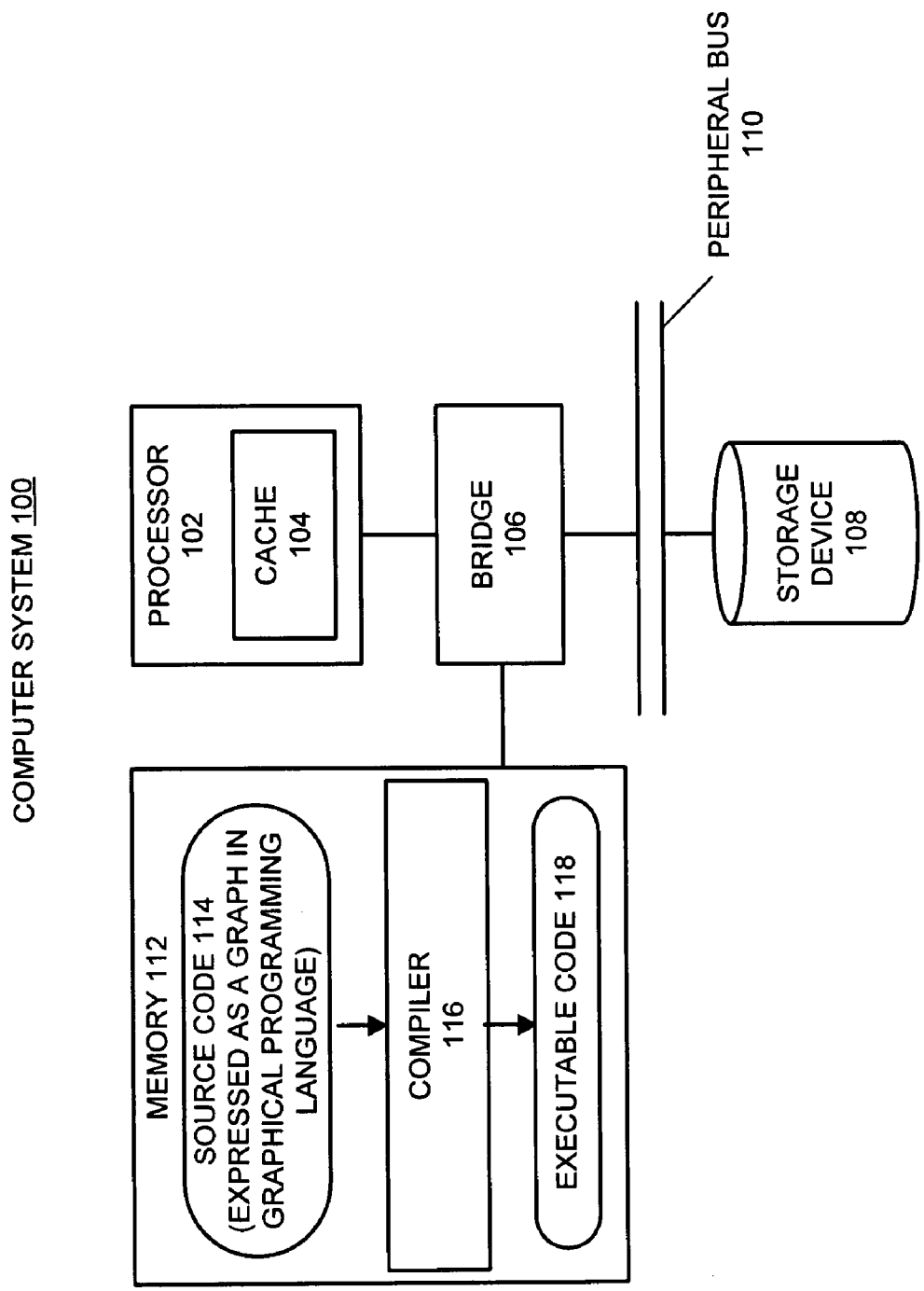
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code 118. In one embodiment of the present invention, source code 114 is developed through a graphical programming language (GPL) and displayed as a graph within a graphical user interface (GUI). This graphical form of source code 114 is described in more detail below with reference to FIGS. 2 and 3.

Note that although the present invention is described in the context of computer system 100 as illustrated in FIG. 1, the present invention can generally operate on any type of computing device. Hence, the present invention is not limited to the specific implementation of computer system 100 as illustrated in FIG. 1.

Terminology

Throughout the specification, the term "node" or "patch" refers to a base processing unit in a GPL, and the term "graph" refers to a set of interconnected nodes. During a graphical programming operation, a programmer creates a graph by dragging nodes into a workspace and making connections between the nodes. Note that both nodes and graphs are executable.

Each node can have one or more input ports and one or more output ports. Each port (either an input port or an output port) is associated with a variable or a parameter. Note that while some nodes can have both input and output ports, other nodes can have only input ports or only output ports.

Note that a "value" of an input/output port of a node in the specification is broadly defined to include different types of data objects, which can include, but are not limited to a number, a string or a bitmap. In one embodiment of the present invention, an input port value is an image. A "connection" from an output port to an input port sets the value on the input port to equal the value on the output port.

A Pass-Through Node

One embodiment of the present invention uses a pass-through node during the refactoring operation. Specifically, a pass-through node typically comprises a single input port and a single output port. The value on the input port is "passed through" to the output port without modification. Note that the output port of the pass-through node can be connected to any number of downstream nodes, which all receive the same value from the output port of the pass-through node.

Refactoring an Input Port of a Node

Figure 2B:
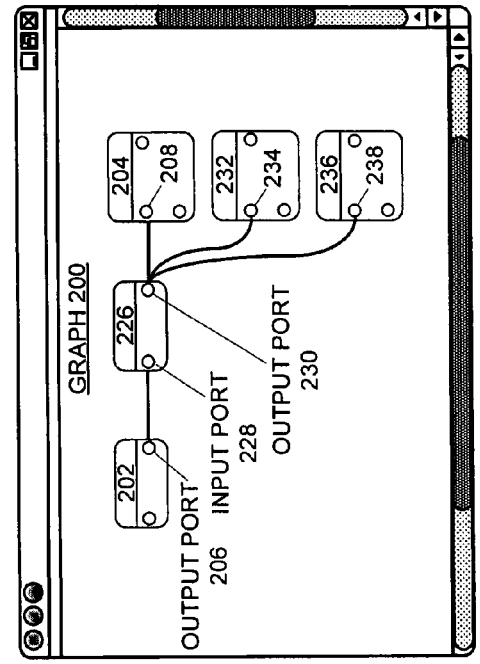
FIG. 2B illustrates the process of refactoring an unconnected input port of a node in accordance with an embodiment of the present invention.
Figure 2C:
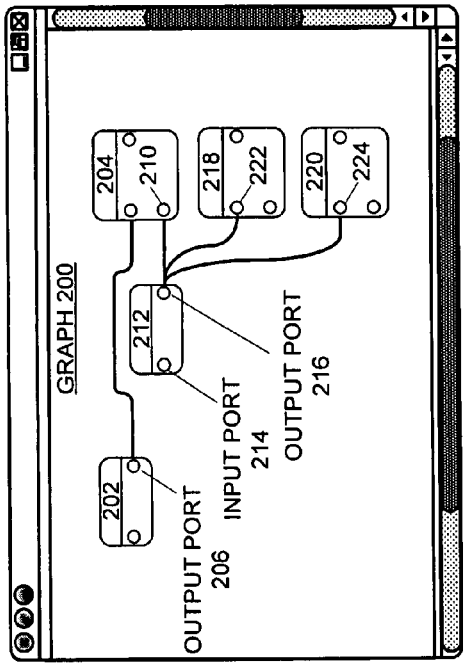
FIG. 2C illustrates the process of refactoring a connected input port of a node in accordance with an embodiment of the present invention.
Figure 2A:
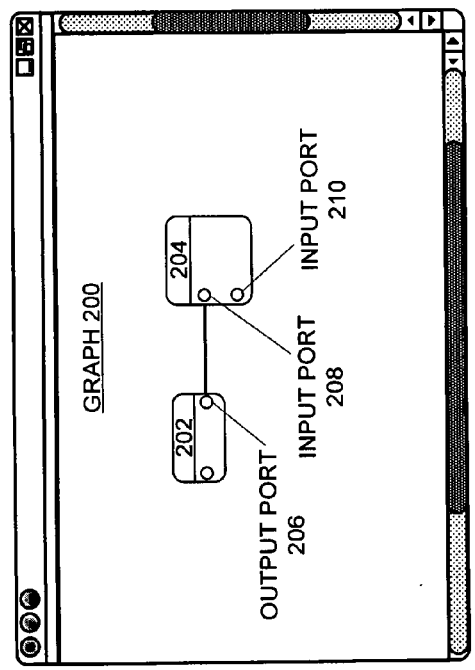
FIG. 2A illustrates a graph comprising an upstream node and a downstream node in accordance with an embodiment of the present invention.

FIGS. 2A-2C illustrate the process of refactoring an input port of a node in accordance with an embodiment of the present invention.

Specifically, FIG. 2A illustrates a graph 200 comprising an upstream node 202 and a downstream node 204 in accordance with an embodiment of the present invention. As seen in FIG. 2A, an output port 206 of upstream node 202 is connected to an input port 208 of downstream node 204. Hence, the value on input port 208 is set by output port 206. Note that node 204 also comprises a second input port 210, which is unconnected.

Note that although the ports of a node are represented as open circles, any other symbols can be used to represent a port, for example, a square or a filled circle.

Refactoring an Unconnected Input Port

FIG. 2B illustrates the process of refactoring the unconnected input port 210 of node 204 in accordance with an embodiment of the present invention. During operation, the system creates a pass-through node 212 which has an input port 214 and an output port 216. Note that the value set on input port 214 is directly propagated to output port 216. Also note that pass-through node 212 is typed according to the data type of input port 210 which is to be refactored.

Next, the system sets the value on input port 214 of pass-through node 212 to match the value on input port 210 which is to be refactored. In one embodiment of the present invention, the system matches the values on input port 210 and input port 214 by performing a bit-to-bit mapping from the input port 210 to input port 214. As a result, the value on input port 210 is copied to input port 214 and subsequently to output port 216. The system then connects output port 216 of pass-through node 212 to input port 210 to obtain a refactored input port 210.

In one embodiment of the present invention, the above-described refactoring procedure is implemented atomically as a single action. Hence, a programmer only sees the end result of the refactoring as illustrated in FIG. 2B without having to perform each step separately.

Upon refactoring input port 210 within graph 200, the user can connect output port 216 of the pass-through node to additional input ports which require the same value. For example, in FIG. 2B, the user has connected output port 216 to two additional downstream nodes 218 and 220, so that both input port 222 of node 218 and input port 224 of node 220 are set to the same value as input port 210.

In one embodiment of the present invention, after refactoring node 210 within graph 200, the value on input node 210 can be modified by simply changing the value on input node 214 of pass-through node 212. This change is then reflected on output port 216 of the pass-through node and automatically propagated to all connected downstream nodes, including input ports 210, 222 and 224.

Refactoring a Connected Input Port

FIG. 2C illustrates the process of refactoring the connected input port 208 of node 204 in accordance with an embodiment of the present invention. To preserve the connectivity of graph 200 and the input port 208 being refactored, the system caches the connectivity information for input port 208. In this example, the connectivity information of port 208 comprises the connection from the output port 206 of node 202. Next, the system creates a pass-through node 226 which has an input port 228 and an output port 230. Note that the value on input port 228 is directly propagated to output port 230. Also note that pass-through node 226 is typed according to the data type of the input port 208 to be refactored.

The system then disconnects input port 208 from output port 206, and refactors input port 208 by connecting output port 230 of pass-through node 226 to input port 208. Next, the system reestablishes the connectivity of graph 200 by connecting output port 206 of node 202 to input port 228 of pass-through node 226. Specifically, the system uses the cached connectivity information to reestablish the connection. Because pass-through node 226 is transparent, the connectivity of graph 200 in FIG. 2A is preserved in FIG. 2C.

In one embodiment of the present invention, the above-described refactoring procedure is implemented atomically as a single (inserting a pass-through node) action. Hence, a programmer only sees the end result of the refactoring as illustrated in FIG. 2C without having to perform each step separately.

After refactoring input node 208, the value on output port 206 of node 202 can be distributed to multiple input ports of downstream nodes (through the pass-through node). As illustrated in FIG. 2C, both input port 234 of node 232 and input port 238 of node 236 are set to the same value as the refactored input port 208.

Refactoring an Output Port of a Node

Figure 3B:
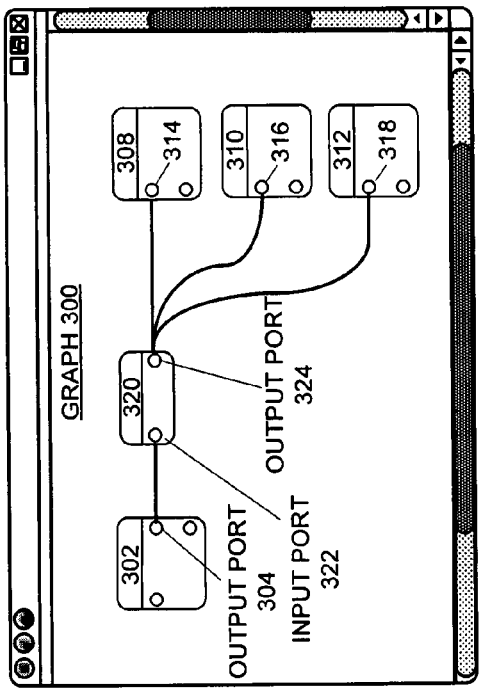
FIG. 3B illustrates the process of refactoring a connected output port of a node in accordance with an embodiment of the present invention.
Figure 3C:
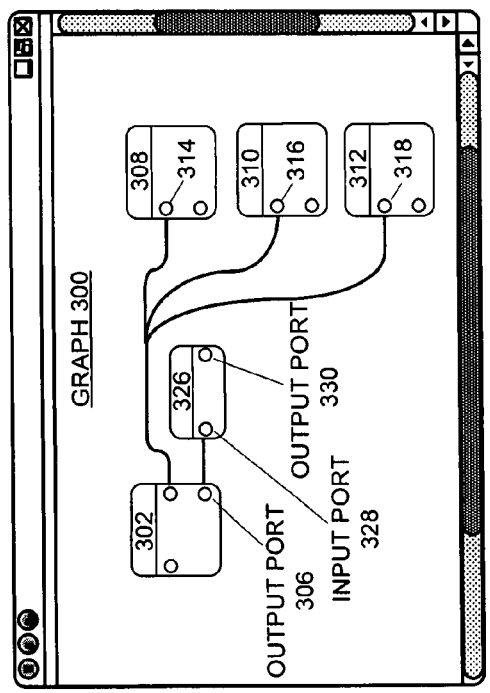
FIG. 3C illustrates the process of refactoring an unconnected output port of a node in accordance with an embodiment of the present invention.
Figure 3A:
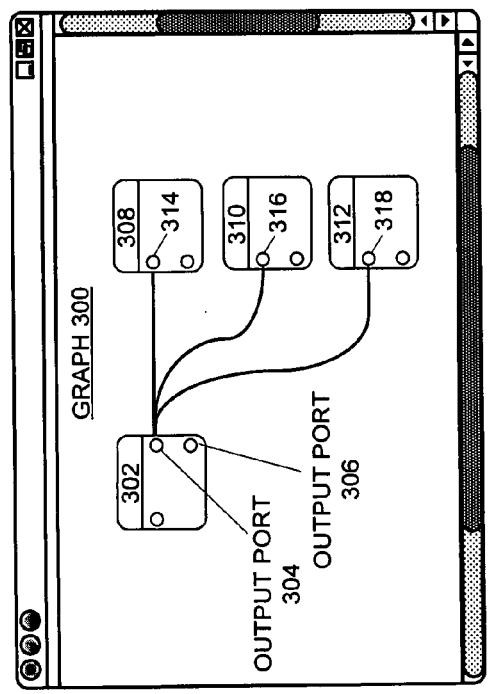
FIG. 3A illustrates a graph comprising an upstream node which is connected to multiple downstream nodes in accordance with an embodiment of the present invention.

FIGS. 3A-3C illustrate the process of refactoring an output port of a node in accordance with an embodiment of the present invention.

Specifically, FIG. 3A illustrates a graph 300 comprising an upstream node 302 which is connected to multiple downstream nodes in accordance with an embodiment of the present invention. As illustrated in FIG. 3A, output port 304 of node 302 is connected to the input ports 314, 316, and 318 of three downstream nodes 308, 310, and 312, respectively. Hence, the values on input ports 314-318 are set by output port 304. Note that node 302 also has a second output port 306, which is not connected to any downstream node.

Refactoring a Connected Output Port

FIG. 3B illustrates the process of refactoring the connected output port 304 of node 302 in accordance with an embodiment of the present invention. To preserve the connectivity of graph 300 and the output port 304 being refactored, the system caches the connectivity information of output port 304. In this example, the connectivity information for output port 304 comprises the three connections from output port 304 to nodes 308-312. Next, the system creates a pass-through node 320 which has an input port 322 and an output port 324. Note that the value on input port 322 is directly propagated to output port 324. Also note that pass-through node 320 is typed according to the data type of the output port 304 to be refactored.

The system then disconnects output port 304 from the downstream nodes, and refactors output port 304 by connecting output port 304 to input port 322 of pass-through node 320. In doing so, the value on output port 324 of pass-through node 320 matches the value on the refactored output port 304. Consequently, the system can use output port 324 of pass-through node 320 in place of the refactored output port 304 for connecting downstream nodes.

Next, the system reestablishes the graph connectivity by connecting output port 324 of pass-through node 320 to the corresponding input ports of the downstream nodes. Specifically, the system uses the cached connectivity information to reestablish the connections. Because pass-through node 320 is transparent, the connectivity of graph 300 in FIG. 3A is preserved in FIG. 3B.

In one embodiment of the present invention, the above-described refactoring procedure is implemented atomically as a single (inserting a pass-through node) action. Hence, a programmer only sees the end result of the refactoring as illustrated in FIG. 3B without having to perform each step separately.

Note that refactoring a connected output port by inserting a pass-through node facilitates efficient modification of a graph in situation when an output port is connected to a large number of downstream nodes. Referring to FIG. 3A, suppose the user needs to insert a math function (e.g., (output value/2)) between output port 304 and each of the downstream nodes. In this situation, the user would have to insert one math function node in each of the three connections. In contrast, after refactoring output port 304 in FIG. 3B, a user can insert a single math function node between output port 304 and pass-through node 320. In the way, all the downstream input ports receive the desired value.

Refactoring an Unconnected Output Port

FIG. 3C illustrates the process of refactoring the unconnected output port 306 of node 302 in accordance with an embodiment of the present invention. During operation, the system creates a pass-through node 326 which has an input port 328 and an output port 330. Note that the value set on input port 328 is directly passed onto output port 330. Also note that pass-through node 326 is typed according to the data type of output port 306 to be refactored.

Next, the system refactors output port 306 by connecting output port 306 to input port 328 of pass-through node 326, so that output port 330 of pass-through node 326 matches a value on the refactored output port 306. As a result, the system can use output port 330 of pass-through node 326 in place of the refactored output port 306 for connecting downstream nodes.

In one embodiment of the present invention, the above-described refactoring procedure is implemented atomically as a single action. Hence, a programmer only sees the end result of the refactoring as illustrated in FIG. 3C without having to perform each step separately.

Process of Refactoring an Input Port

Figure 4A:
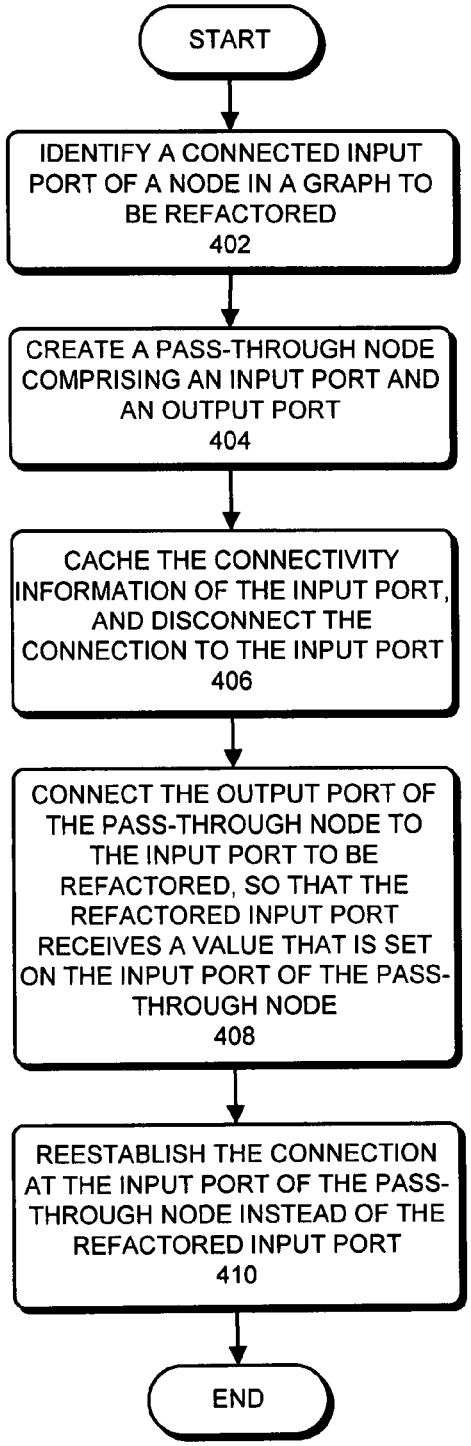
FIG. 4A presents a flowchart illustrating the process of refactoring a connected input port in accordance with an embodiment of the present invention.

FIG. 4A presents a flowchart illustrating the process of refactoring a connected input port in accordance with an embodiment of the present invention.

During operation, the system identifies an input port of a node in a graph to be refactored, wherein the input port is initially connected (step 402). Next, the system creates a pass-through node comprising an input port and an output port, wherein the value on the output port equals the value on the input port (step 404). The system then caches the connectivity information associated with the input port to be refactored, and subsequently disconnects the connection to the input port (step 406). The system next connects the output port of the pass-through node to the input port to be refactored, so that the refactored input port receives a value that is set on the input port of the pass-through node (step 408). Finally, the system reestablishes the connection at the input port of the pass-through node instead of the refactored input port (step 410).

Figure 4B:
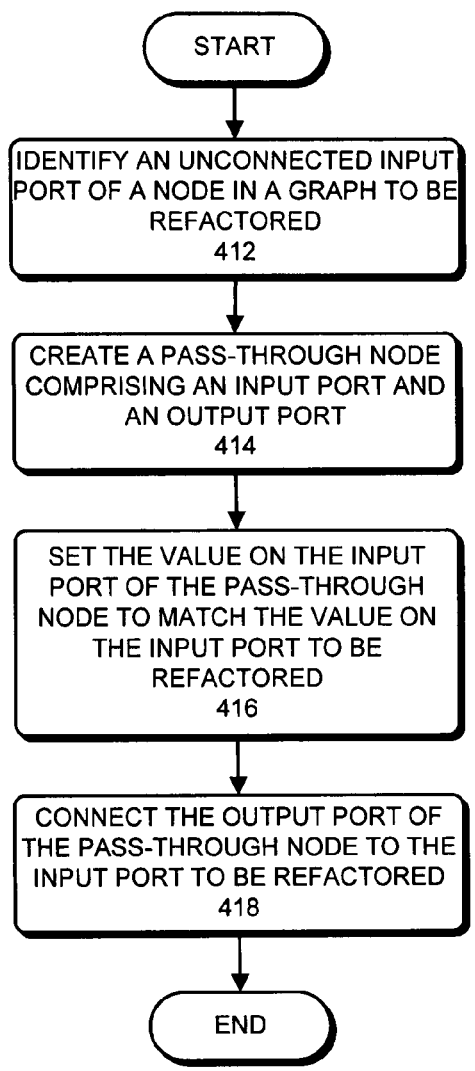
FIG. 4B presents a flowchart illustrating the process of refactoring an unconnected input port in accordance with an embodiment of the present invention.

FIG. 4B presents a flowchart illustrating the process of refactoring an unconnected input port in accordance with an embodiment of the present invention.

During operation, the system identifies an input port of a node in a graph to be refactored, wherein the input port is initially unconnected (step 412). Next, the system creates a pass-through node comprising an input port and an output port, wherein the value on the output port equals the value on the input port (step 414). The system next sets the value on the input port of the pass-through node to match the value on the input port to be refactored (step 416). As a result, the value on the output port of the pass-through node equals the value on the input port to be refactored. The system then connects the output port of the pass-through node to the input port to be refactored (step 418).

Process of Refactoring an Output Port

FIG. 5A presents a flowchart illustrating the process of refactoring a connected output port in accordance with an embodiment of the present invention.

During operation, the system identifies an output port of a node in a graph to be refactored, wherein the output port is initially connected (step 502). Next, the system creates a pass-through node comprising an input port and an output port, wherein the value on the output port equals the value on the input port (step 504). The system then caches the connectivity information associated with the output port to be refactored, and subsequently disconnects the connection from the output port (step 506). The system next connects the output port of the node to be refactored to the input port of the pass-through node, so that the output port of the pass-through node matches the value on the refactored output port (step 508). Next, the system reestablishes the connection using the output ports of the pass-through node in place of the refactored output port (step 510).

FIG. 5B presents a flowchart illustrating the process of refactoring an unconnected output port in accordance with an embodiment of the present invention.

During operation, the system identifies an output port of a node in a graph to be refactored, wherein the output port is initially unconnected (step 512). Next, the system creates a pass-through node comprising an input port and an output port, wherein the value on the output port equals the value on the input port (step 514). The system next connects the output port to be refactored to the input port of the pass-through node, so that the output port of the pass-through node matches the value on the refactored output port (step 516). Next, the system uses the output port of the pass-through node in place of the refactored output port (step 518).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for refactoring a port of a node in a graph, wherein each node in the graph is a graphical representation of a base processing unit in a graphical programming language, wherein the node has one or more input ports and one or more output ports, and wherein a refactoring operation changes the graph to improve the topology of the graph while preserving the functional connectivity of the graph, the method comprising:
   identifying an input port of the node to be refactored;
   creating a pass-through node, wherein the value set on an input port of the pass-through node is directly copied to an output port of the pass-through node; and
   connecting the output port of the pass-through node to the input port to be refactored, so that the refactored input port receives a value that is set on the input port of the pass-through node.

2. The method of claim 1, wherein if the input port to be refactored is initially connected, the method further comprises:
   caching the connectivity information for the input port to be refactored;
   disconnecting the connection to the input port to be refactored; and
   establishing the connection at the input port of the pass-through node instead of at the refactored input port, wherein reestablishing the connection involves using the cached connectivity information to establish the connection.

3. The method of claim 1, wherein if the input port to be refactored is initially unconnected and if the value on the input port is set, the method further comprises setting a value on the input port of the pass-through node to match the value on the input port to be refactored, whereby the value on the output port of the pass-through node equals the value on the input port to be refactored.

4. The method of claim 1, wherein the value on the input port of the pass-through node can include a data object, such as a bitmap.

5. A method for refactoring a port of a node in a graph, wherein each node in the graph is a graphical representation of a base processing unit in a graphical programming language, wherein the node has one or more input ports and one or more output ports, and wherein a refactoring operation changes the graph to improve the topology of the graph while preserving the functional connectivity of the graph, the method comprising:
- identifying an output port of the node to be refactored;
- creating a pass-through node, wherein the value set on an input port of the pass-through node is directly copied to an output port of the pass-through node;
- connecting the output port of the node to be refactored to the input port of the pass-through node, so that the output port of the pass-through node matches a value on the refactored output port; and
- using the output port of the pass-through node in place of the refactored output port.

6. The method of claim 5, wherein if the output port to be refactored is initially connected, the method further comprises:
- caching connectivity information for the output port to be refactored;
- disconnecting the connection from the output port to be refactored; and
- wherein using the output port of the pass-through node in place of the refactored output port involves reestablishing the connection using the output port of the pass-through node in place of the refactored output port, wherein reestablishing the connection involves using the cached connectivity information to reestablish the connection.

7. The method of claim 5, wherein the value on the refactored output port can include a data object, such as a bitmap.

8. A non-transitory computer-readable storage medium storing instructions that when executed by a computer cause the computer to perform a method for refactoring a port of a node in a graph, wherein each node in the graph is a graphical representation of a base processing unit in a graphical programming language, wherein the node has one or more input ports and one or more output ports, and wherein a refactoring operation changes the graph to improve the topology of the graph while preserving the functional connectivity of the graph, the method comprising:
- identifying an input port of the node to be refactored;
- creating a pass-through node, wherein the value set on an input port of the pass-through node is directly copied to an output port of the pass-through node; and
- connecting the output port of the pass-through node to the input port to be refactored, so that the refactored input port receives a value that is set on the input port of the pass-through node.

9. The non-transitory computer-readable storage medium of claim 8, wherein if the input port to be refactored is initially connected, the method further comprises:
- caching the connectivity information for the input port to be refactored;
- disconnecting the connection to the input port to be refactored; and
- reestablishing the connection at the input port of the pass-through node instead of at the refactored input port, wherein reestablishing the connection involves using the cached connectivity information to reestablish the connection.

10. The non-transitory computer-readable storage medium of claim 8, wherein if the input port to be refactored is initially unconnected and if the value on the input port is set, the method further comprises setting a value on the input port of the pass-through node to match the value on the input port to be refactored, whereby the value on the output port of the pass-through node equals the value on the input port to be refactored.

11. The non-transitory computer-readable storage medium of claim 8, wherein the value on the input port of the pass-through node can include a data object, such as a bitmap.

12. A non-transitory computer-readable storage medium storing instructions that when executed by a computer cause the computer to perform a method for refactoring a port of a node in a graph, wherein each node in the graph is a graphical representation of a base processing unit in a graphical programming language, wherein the node has one or more input ports and one or more output ports, and wherein a refactoring operation changes the graph to improve the topology of the graph while preserving the functional connectivity of the graph, the method comprising:
- identifying an output port of the node to be refactored;
- creating a pass-through node, wherein the value set on an input port of the pass-through node is directly copied to an output port of the pass-through node;
- connecting the output port of the node to be refactored to the input port of the pass-through node, so that the output port of the pass-through node matches a value on the refactored output port; and
- using the output port of the pass-through node in place of the refactored output port.

13. The non-transitory computer-readable storage medium of claim 12, wherein if the output port to be refactored is initially connected, the method further comprises:
- caching connectivity information for the output port to be refactored;
- disconnecting the connection from the output port to be refactored; and
- wherein using the output port of the pass-through node in place of the refactored output port involves reestablishing the connection using the output port of the pass-through node in place of the refactored output port, wherein reestablishing the connection involves using the cached connectivity information to reestablish the connection.

14. The non-transitory computer-readable storage medium of claim 12, wherein the value on the refactored output port can include a data object, such as a bitmap.

15. An apparatus that refactors a port of a node in a graph, wherein each node in the graph is a graphical representation of a base processing unit in a graphical programming language, wherein the node has one or more input ports and one or more output ports, and wherein a refactoring operation changes the graph to improve the topology of the graph while preserving the functional connectivity of the graph, comprising:
- an identification mechanism configured to identify an input port of the node to be refactored;
- a creation mechanism configured to create a pass-through node, wherein the value set on an input port of the pass-through node is directly copied to an output port of the pass-through node; and
- a connection mechanism configured to connect the output port of the pass-through node to the input port to be refactored, so that the refactored input port receives a value that is set on the input port of the pass-through node.

16. An apparatus that refactors a port of a node in a graph, wherein each node in the graph is a graphical representation of a base processing unit in a graphical programming language, wherein the node has one or more input ports and one or more output ports, and wherein a refactoring operation changes the graph to improve the topology of the graph while preserving the functional connectivity of the graph, comprising:

an identification mechanism configured to identify an output port of the node to be refactored;

a creation mechanism configured to create a pass-through node, wherein the value set on an input port of the pass-through node is directly copied to an output port of the pass-through node;

a connection mechanism configured to connect the output port of the node to be refactored to the input port of the pass-through node, so that the output port of the pass-through node matches a value on the refactored output port; and a utilization mechanism configured to use the output port of the pass-through node in place of the refactored output port.

17. The method of claim 1, wherein creating the pass-through node involves setting a type of the pass-through node to match a data type of the input port of the node to be refactored.

* * * * *

UNITED STATES PATENT AND TRADEMARK OFFICE
CERTIFICATE OF CORRECTION

PATENT NO. : 7,912,964 B2  Page 1 of 1
APPLICATION NO. : 11/811118
DATED : March 22, 2011
INVENTOR(S) : Alessandro Sabatelli et al.

It is certified that error appears in the above-identified patent and that said Letters Patent is hereby corrected as shown below:

In column 8, line 48, in claim 2, delete "establishing" and insert -- reestablishing --, therefor.

Signed and Sealed this
Twenty-ninth Day of November, 2011

David J. Kappos
*Director of the United States Patent and Trademark Office*